June 1, 1965  D. STANIMIROVITCH  3,186,877
SEPARATORS FOR ALKALINE ACCUMULATORS
Filed June 11, 1962  4 Sheets-Sheet 1
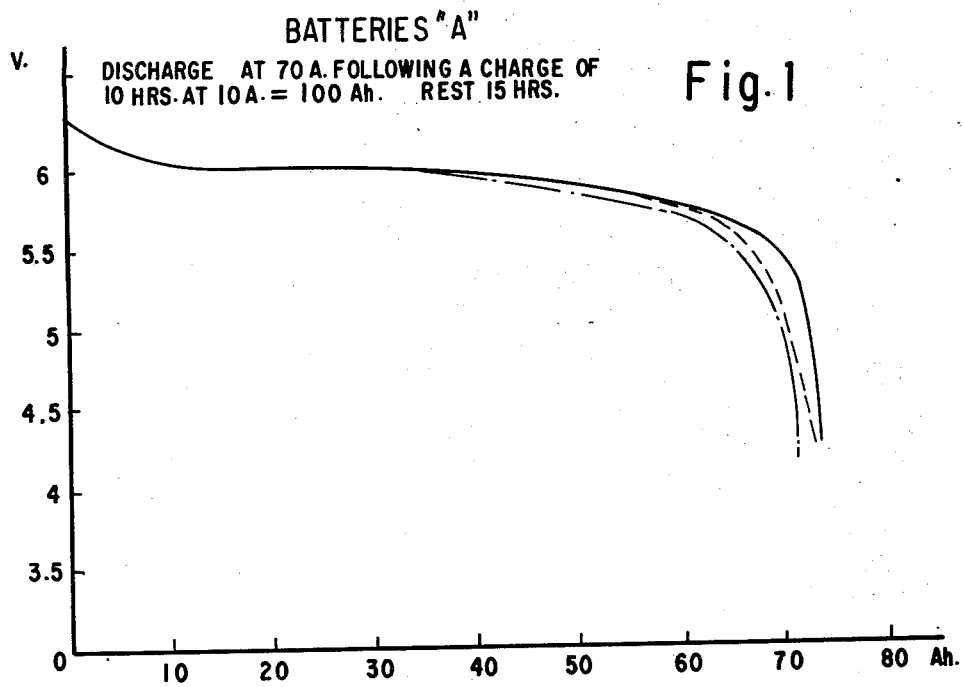
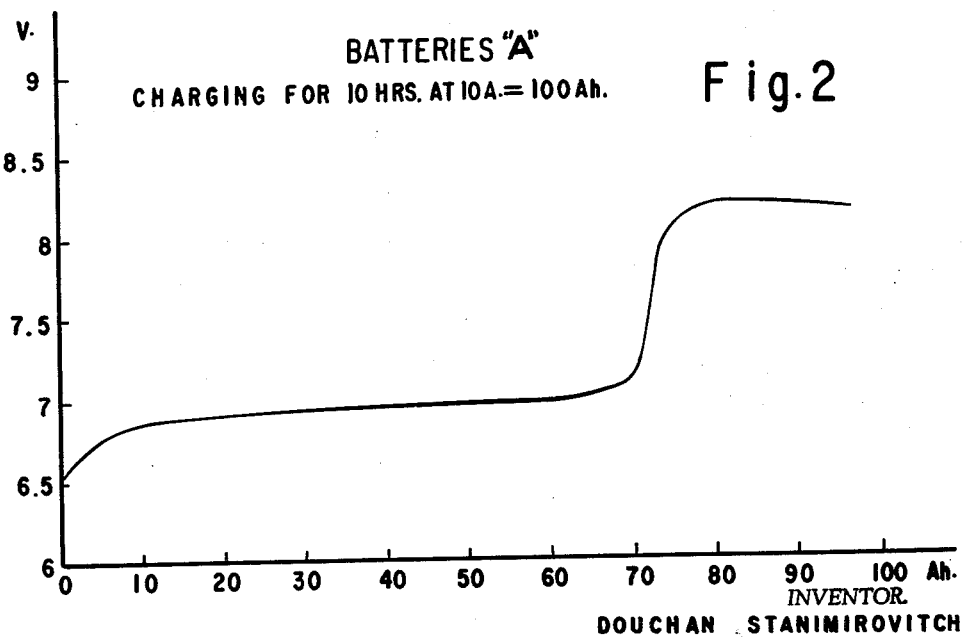
INVENTOR.
DOUCHAN STANIMIROVITCH
BY
ATTORNEYS

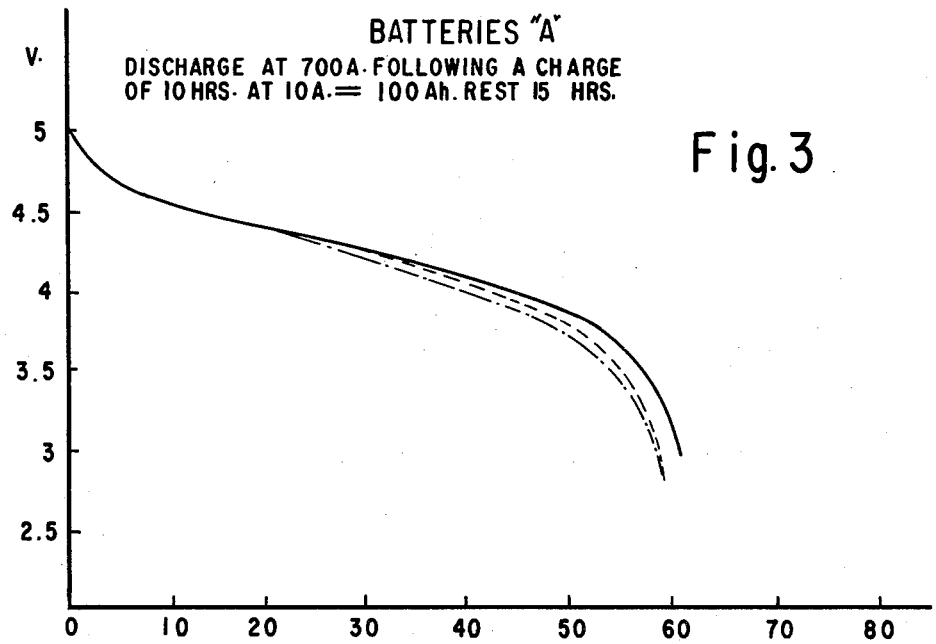
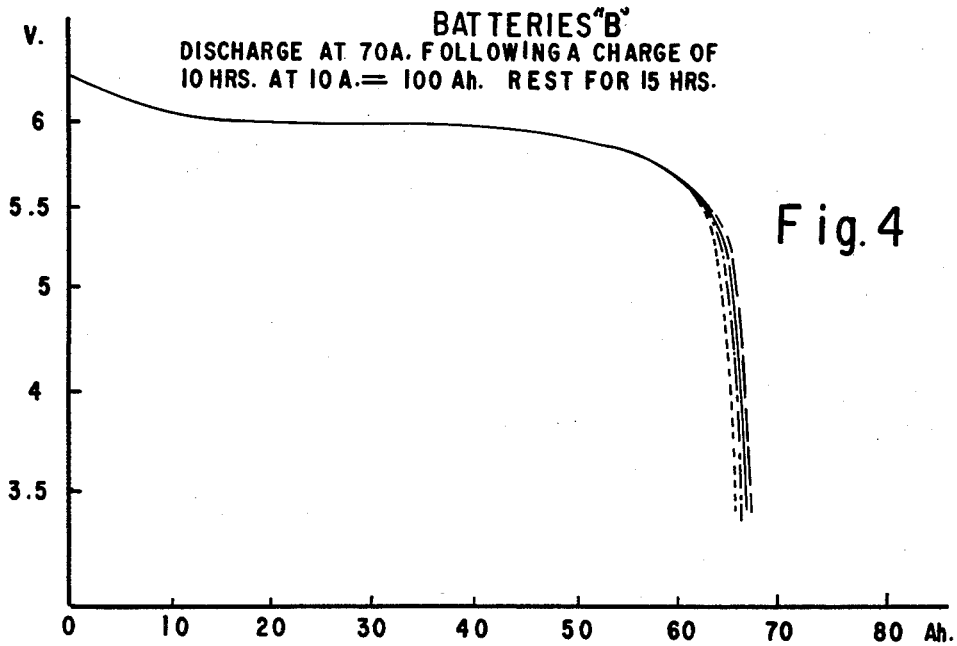

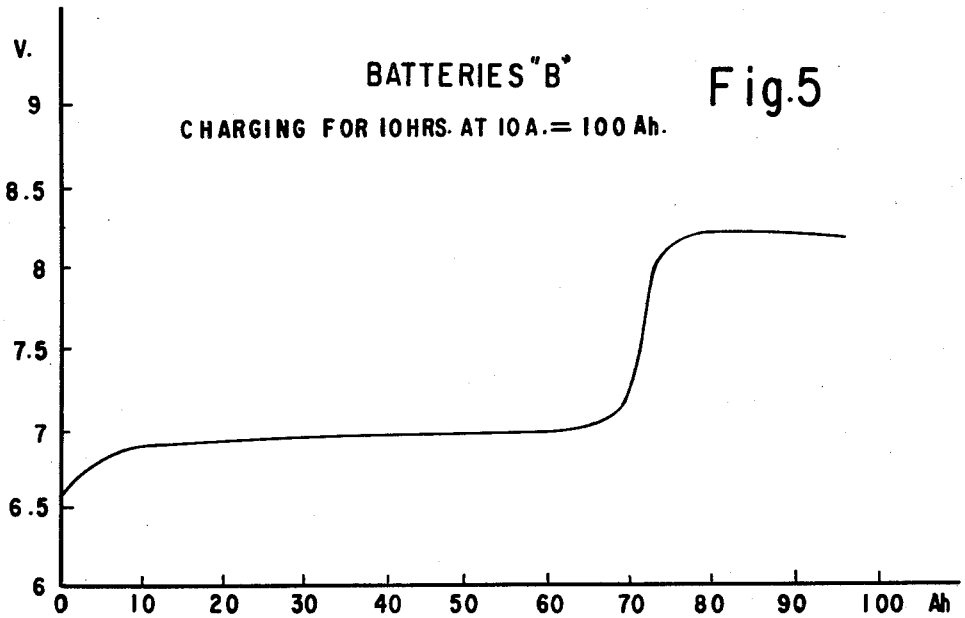
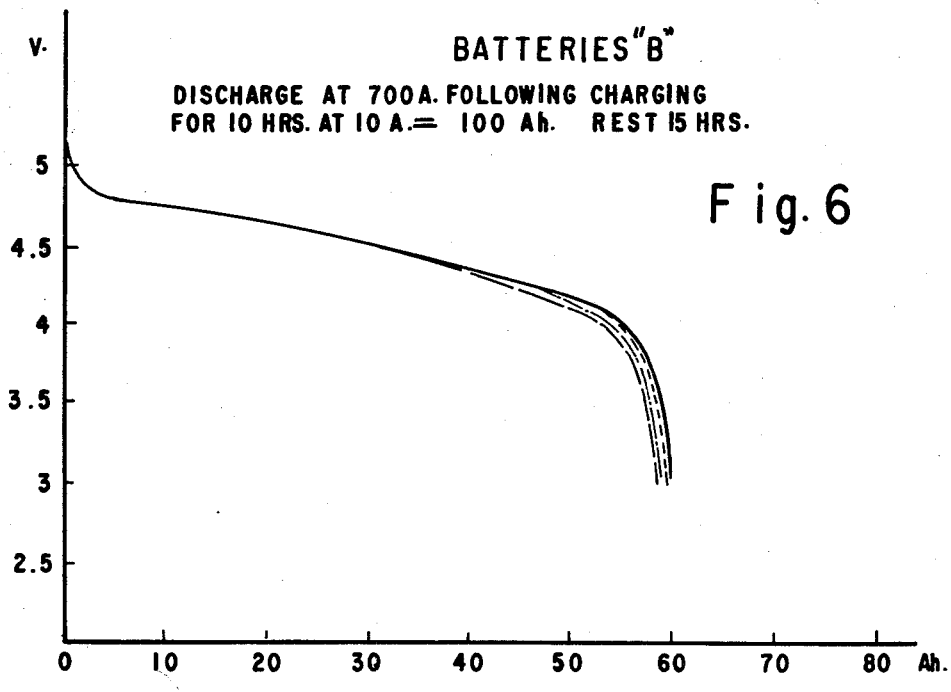

June 1, 1965   D. STANIMIROVITCH   3,186,877
SEPARATORS FOR ALKALINE ACCUMULATORS
Filed June 11, 1962   4 Sheets-Sheet 4

INVENTOR.
DOUCHAN STANIMIROVITCH
BY
ATTORNEYS 3,186,877
SEPARATORS FOR ALKALINE ACCUMULATORS
Douchan Stanimirovitch, Paris, France, assignor to Societe des Accumulateurs Fixes et de Traction (Societe Anonyme), Romainville, France, a company of France
Filed June 11, 1962, Ser. No. 201,486
Claims priority, application France, June 12, 1961, 864,688
4 Claims. (Cl. 136—143)

This invention primarily relates to a new separator for electric accumulators, electrolytic cells aryl all other suitable kindred devices designed to retain or immobilize the electrolyte by capillarity.

It is known that capillary separators can be constructed in different ways. They may be composed of fabrics containing a tightly woven warp and weft, to provide fine pores, or nonwoven textures characterized by the fact that the fibers are arranged in a substantially parallel direction, said fibers being spot-glued at cross-overs as by means of a cement or other suitable binding agent, or they even may be characterized by felted textures produced by an entangling of fibers distributed at random.

It has, on the other hand, been suggested to use several superposed layers (two or three) of such fabrics in order to form separators that may be designated as composite separators, such as, for example, the so-called "duplex or triplex" separators.

It has likewise been suggested to manufacture separators in such a way that they retain or immobilize an important quantity of electrolyte or else that they provide great electrolyte retentivity.

All of these special types of construction of separators have their respective utilities in certain fields of application of separators for electrochemical generators. However, they may be inadequate to provide a proper guarantee of the operation of accumulators in which the electrolyte volume is variable.

Indeed, it has been found by research that it had wrongly been asserted that the electrolyte volume was at all times invariable in all accumulators. It was found for instance that, in a nickel-cadmium alkaline accumulator, there occurred an electrolyte-volume variation that is essentially brought about by the variation in the state of hydration of the active materials between the charged and discharged state. Förster and Zedner carried out a number of studies along this line. They came to the conclusion that the active materials released a body of water during the charge, thus increasing the electrolyte volume, and absorbed water during the discharge, thereby decreasing the electrolyte volume. Only the magnitude of this variation can be indicated since it depends on the state of hydration of the active materials, hydration depending on a number of factors, among others that of their physical state. This variation has been found to be of the order of 1 cc. of water per 1 ah. capacity. This variation has practically no effect whatsoever with an accumulator containing a large amount of electrolyte, e.g. 10 to 20 cc. per ah., which is the case with many alkaline accumulators. If, on the contrary, by design, only a few cubic centimeters of electrolyte per ah, are provided for this water variation becomes critical.

Keeping this requirement in mind, it was proposed to provide a certain quantity of electrolyte immobilized in a porous separator between the electrodes, to be immediately available for rapid discharges. By means of this arrangement, significant progress was achieved particularly in the construction of high output, thin, sintered electrodes for alkaline accumulators used, for instance, for the starting of internal combustion and reaction engines.

However, in spite of the substantial progress thus achieved, it was noted that, for reasons still unknown, there were substantial variations in the results achieved.

Trying to find the causes of these disturbances, I discovered new means that constitute the object of the present invention and that enabled me to achieve not only comparable results, but also and especially to improve the discharge voltage, due to a lowering of the internal resistance. A further result is a better utilization of the active materials in rapid discharges.

Analyzing the reactions occurring during fast discharges, I took into account that it does not suffice to place an adequate amount of electrolyte between the electrodes. It is necessary to provide, in addition, means for permitting this electrolyte to diffuse rapidly between the two compartments, i.e., the cathode and anode compartments, while remaining fixed by capillary action.

In the search for a solution of this problem, two types of difficulties were encountered. By using, on the one hand, a separator powerfully immobilizing the electrolyte, the latter would not diffuse rapidly enough for balancing the electrolyte concentrations in the anode and cathode compartments. This point is, however, very important, because any concentration variation in the two compartments, i.e., cathode and anode compartments, translates itself into an increase in the specific resistance of the electrolyte, its average concentration selected being that providing the minimum specific resistance.

Experimenting, on the other hand, with a separator that would not firmly immobilize the electrolyte, one might, in attempting to facilitate diffusion of the latter, encounter inadequate immobilization of the electrolyte, which would translate itself into the likelihood, under certain circumstances, of permitting the electrolyte to escape easily from the separator.

Object and features of the present invention are to provide separators that make it possible to remedy these different drawbacks. Such separators are characterized particularly by the fact that each has a high degree of capillarity varying in the sense of the thickness between the surfaces in contact with the electrodes of oppposite polarity.

According to another feature characteristic of the invention, each is formed of several layers having respectively different degrees of capillarity.

According to one mode of construction, such a separator is formed by the superposition of two or a greater number of sheets, one of which at least has a greater degree of capillarity than the others, that is, it has a more pronounced property for retaining the electrolyte in its pores.

It can indeed be noted that, positioning such separator so that the layer or surface of reduced retentive capacity is in contact with the compartment, that is the center of the most substantial electrolyte volume variations, the electrode will, at all times, be provided with the appropriate amount of liquid without thereby causing any danger of improper leakage of electrolyte from the separator pores in view of the fact that the adjacent layers or sheets of such a separator would retain an adequate quantity of electrolyte at all times.

Generally speaking, it can thus be said that, with the separator of this invention when it is made up of two superposed sheets, one of them displays a very pronounced capillarity, absorbing electrolyte rapidly and retaining it very strongly, whereas the other one absorbs it at a distinctly slower pace and has a much weaker retentivity for the electrolyte.

The rate of absorption by capillarity may, as a matter of fact, be taken as a criterion of the degree of retentivity. In this case, one of the layers will have a rate of absorption that will be practically instantaneous, whereas the other one will absorb electrolyte at a slower rate. The respective rates of absorption may, for instance, be determined by the time required for one drop of electrolyte to be absorbed by respective layers of a specimen separator.

If retentivity is taken as a criterion, one may use one separator layer having a very pronounced retentivity and another one whose retentivity is less pronounced. Such retentivity may, for instance, be measured by a centrifugation test and by thereby determining the loss of electrolyte under the influence of a field equal to several g's (force of gravity) of acceleration.

Likewise, the capillarity itself may be used as a criterion; this capillarity may be defined by the dimensions of the pores and the pattern of their distribution as well as by the nature of the fibers used.

As pointed out above, the layer or surface having a lower retentivity is designed for contact with the compartment where the most substantial electrolyte volume fluctuations originate.

According to one exemplified embodiment, the surface or layer having the least retentivity is positioned facing the negative electrode.

In certain instances, the contrary may be indicated, e.g., in the event that the porosity of the negative electrode is particularly high.

Another important factor is the suitable choice of thicknesses of the separator layers. Thus, for instance, if there is a likelihood of particularly heavy electrolyte density variations in one electrode, which is likely to happen if an electrode having a high volume capacity and, consequently, a low porosity, is being used, a separator layer having a low electrolyte retentivity may be placed in contact with this electrode, said layer being thicker than the other one.

It should be pointed out that the separator of this invention may be composed either of a single piece of material having a capillarity varying in the sense of its thickness or by superpositioning and possibly uniting of separate sheets respectively of differing capillarities.

It is obvious that the various component layers or sheets of the separator of this invention may be of identical or different, natural or synthetic materials or mixtures thereof. Suitable natural materials could include asbestos or other mineral fibers or other natural fibers that are substantially unaffected by the electrolyte. Suitable synthetic materials could, for example, be fibers of polyvinyl copolymer or polyamides or of other synthetic materials substantially unaffected by the electrolyte.

The separator of this invention as just described may be used in sealed accumulators in which the products of electrolysis are reabsorbed by diffusion reactions caused by the proximity of the electrodes. In this case (sealed accumulators), one will select the separator layers in such a way that the distance between adjacent electrodes of opposite polarity will not exceed e.g., 0.2 mm, and that the surfaces of the separator layers will be in very close contact with the surfaces of the adjacent electrodes.

It should be pointed out that the separator in accordance with the invention is of particularly advantageous application in the case of open accumulators, especially in cadmium-nickel alkaline accumulators having thin sintered electrodes. Such open accumulators may be characterized by their load voltage, indicating a sudden increase as soon as the accumulator is charged. Indeed, in such accumulators, the two electrodes are strongly polarized as soon as they become charged, which is indicated by a respective rise of their potentials. It should, on the other hand, be pointed out that it is especially the potential of the negative electrode that supplies this increase in the load voltage.

This load voltage is then suitably used to act in known manner on the charging device in order to cause either a lowering of the charging current to a level acceptable for operational requirements or a cut-out of the charging circuit.

The separator layers must, to be in accordance with the invention, be selected in such a way that, while remaining at their surfaces in close contact with the adjacent electrodes of opposite polarity, they establish between the latter a distance equal to or exceeding about 0.35 mm. In this way, the electrodes are polarized as soon as accumulator charging has been achieved.

These accumulators may be provided with a valve, opening up at a few hundred grams pressure and preventing the electrolyte from carbonating due to the effect of the carbon dioxide present in the air and, especially, in order to protect the accumulator against the depolarizing effect of the dissolved oxygen, derived from the atmosphere. Indeed, if the accumulator was to remain at rest for some time, its negative electrodes would, in the long run, be likely to become oxidized, that is, depolarized, owing to the effect of the dissolved oxygen which, as it was gradually used up, would be replenished by oxygen from the atmosphere. Indeed, this electrochemical depolarization by the dissolved oxygen is particularly effective with negative electrodes having a sintered nickel support, because the negative active material forms with the latter an electrochemical cell in which the nickel constituting the positive electrode is the very one that is depolarized by the dissolved oxygen.

It must be pointed out that the separator in accordance with the invention has universal application in that a separator of the same type may be used either with sealed accumulators or with open accumulators having electrodes that are polarized on charge completion. All that is required is merely a modification of its thickness. Thus, for instance, if the accumulator is a sealed accumulator, a separator is used that will fix the distance between adjacent electrodes of opposite polarity below approximately 0.2 mm. If it is desired to provide an open accumulator with polarizable electrodes, this distance should exceed approximately 0.33 mm. However, practice and theory confirm the fact that, as long as the distance between the electrodes is below 0.2 mm., the rate of recombination of the products of the electrolysis on charge completion at industrially usable current densities is determined solely by the diffusion. As soon as this distance exceeds 0.3 mm., evolvement of gases occur. The current densities at which there may be a recombination remain very distinctly below those noted in the first case because gaseous oxygen has to redissolve. This is the reaction that is slow.

It is understood that the invention relates, as new industrial products, to electric accumulators, electrolytic cells, as well as to all other articles in which the aforementioned separator may be utilized.

Other objects and features of the invention will become apparent from the following specification and the accompanying drawings, wherein, solely by way of example, are shown test characteristics obtained with known accumulators using triplex separators and with accumulators using separators made in accordance with the invention. Also shown are separators and accumulators embodying the separators of the invention. In the drawings:

FIGS. 1 to 3 are graphs with volts as ordinates and ampere hours as abscissae, relating to accumulators "A," each provided with a known, so-called "triplex" separator and showing test characteristics thereof;

FIGS. 4 to 6 are graphs with volts as ordinates and ampere hours as abscissae relating to an accumulator "B," each provided with a separator in accordance with the invention, also showing test characteristics thereof;

Figure 7:
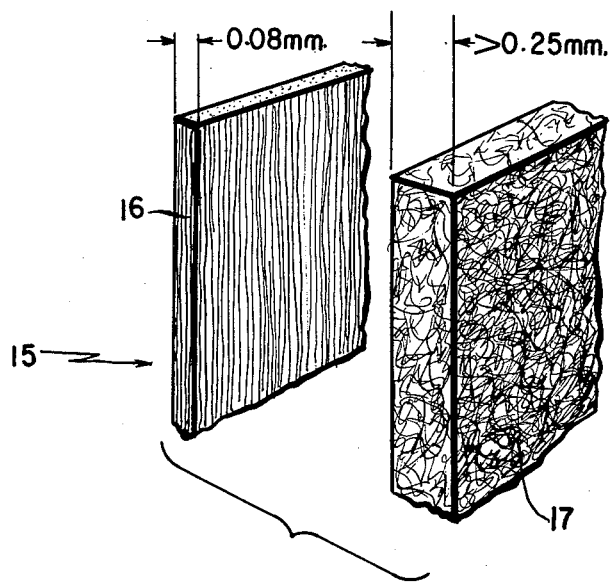
FIG. 7 is an exploded view of a separator according to this invention as used in batteries "B.
Figure 8:
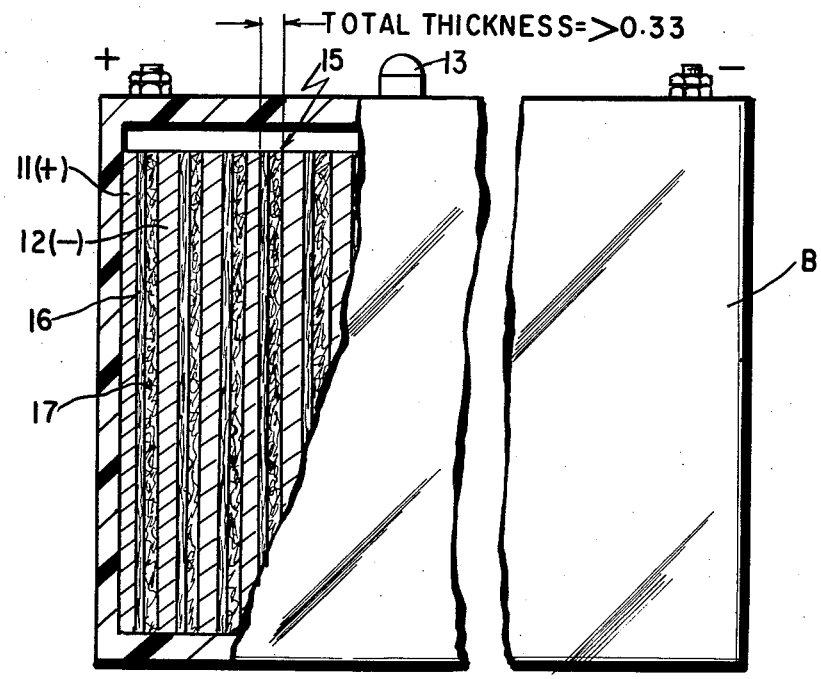
" and FIG. 8 is a diagrammatic sectional view of an accumulator using the separator of this invention.

The following is a description of the nature of the tests made and the results obtained.

An accumulator "A" of known type was subjected to testing.

It was a storage battery made up of 5 cells, each cell comprising 24 positive and 25 negative electrodes. The active surface of each electrode was equal to 105 sq. cm. (dimension: 15 x 7 cm.) and its thickness about 0.85 mm. These electrodes were thin plates essentially of thin perforated metal sheets coated on both sides with layers of metal particles, eg. nickel, compacted and sintered in conventional ways. Such plates were approximately 0.85 mm. thick and impregnated with nickel hydroxide with an addition of cobalt hydroxide in a known manner for the positive plates and cadmium hydroxide for the negative plates.

The separator used was a triplex separator interposed between adjacent pairs of electrodes of opposite polarity and consisted of:

One layer having a thickness of 0.08 mm. made of a non-woven synthetic fiber material.

One layer of "cellophane" having a thickness of 0.02 mm.

One layer of a woven polyamide fabric with ordinary warp and woof, having a thickness equal to 0.12 mm.

The overall thicknes of each such separator was 0.22 mm.

The electrolyte was a potassium hydroxide solution at 28° Baumé.

Three similar batteries "A" were subjected to tests. The results obtained by these tests appear in the graphs of FIGS. 1 to 3.

One can infer therefrom in particular that:

(1) With respect to FIGURE 1, the output of the batteries "A" in a discharge at 70 a. is, for the three batteries tested, equal, on the average to 72 ah.

(2) With respect to FIGURE 2, during the subsequent charge, the load voltage rise occurs at about 72 ah., the voltage fluctuation being equal to (8.25−7)=1.25 volts for 5 cells.

(3) With respect to FIGURE 3, the output obtained in a discharge at 700 a. following the preceding charge is, on the average, 59 ah. The average voltage at a 30 ah. discharge is 4.2 volts.

Another test series used batteries designated by the letter "B" and constructed according to the invention. Each battery "B" included positive electrodes 10 and negative electrodes 11 of the same kind and dimensions as those of known batteries "A." Each battery "B" had a valve 13 in its casing 14 opening at a pressure of a few hundred gms./cm.² in the same way as known batteries "A."

The same type of electrodes as employed in batteries "A" were used, but their number (22 positive and 23 negative) was reduced to permit increasing the distance between them. The separator 15 between each pair of electrodes of batteries "B" were constituted of the following two layers:

One layer 16 of a thickness of approximately 0.08 mm. containing an non-woven material comprised preferably of polyvinyl copolymer fibers, or of other fibers unaffected by the electrolyte. This non-woven material is characterized by the quasi-instantaneous absorption of a drop of electrolyte.

One layer 17 having a thickness equal to or exceeding 0.25 mm. composed of a felted material containing preferably polyamide fibers with 10% by weight of viscose, bonded at cross-overs with neoprene or the like bonding material or containing other fibers unaffected by the electrolyte.

This felted material requires over or a period of approximately 3 minutes to absorb one drop of electrolyte.

The overall thickness of this separator 15 was equal to or greater than 0.33 mm.

The same electrolyte as that used with batteries "A" was used.

The results obtained for four similar batteries "B" are shown in the graphs of FIGS. 4 to 6. They indicate that:

(1) With respect to FIGURE 4, the output of a battery "B" when discharged at 70 a. on the average for the four batteries tested was about 65 ah., which is normal in view of the fact that the number of electrodes of batteries B had been reduced in comparison with those of batteries "A."

(2) With respect to FIGURE 5, the charge characteristic is absolutely identical to that of the example A. It should be pointed out that this remarkable result was obtained without the use of "cellophane" in the separators of batteries "B."

(3) With respect to FIGURE 6, the output obtained at a discharge at 700 a. is, on the average, equal to 59.5 ah. The average voltage at a discharge of 30 ah. is 4.5 v.

The results obtained are summarized in the following table:

|  | Battery "A," 3 batteries tested | Battery "B," 4 batteries tested |
| --- | --- | --- |
| Number of Electrodes | 24 positive, 25 negative. | 22 positive, 23 negative. |
| Average thickness of the Electrodes. | 0.85 mm | 0.85 mm. |
| Average Distance Between the Electrodes. | 0.22 mm | 0.33 mm. |
| Electrolyte | Potassium hydroxide solution at 28° Baumé. | Potassium hydroxide solution at 28° Baumé. |
| Capacity at 70 a | 72 ah | 65 ah. |
| Voltage Increase on Charge Completion. | 1.25 volt | 1.25 volt. |
| Capacity at 700 a | 59 ah | 59.5 ah. |
| Voltage at a Discharge of 30 ah | 4.2 volt | 4.5 volt. |

For batteries "B," the results at 700 a. indicate the value of the improvements brought about by the present invention in view of the fact that the latter were achieved by comparison with a battery "A" which, heretofore, certainly had been deemed the best in the world with regard to rapid discharges.

The improvements in batteries "B" obtained at a discharge at 700 a. can be summerized as follows: while using about 8% fewer electrodes, and thus a correspondingly smaller amount of active materials, the same capacity was achieved at a voltage gain of $$100 \times \frac{4.5 - 4.2}{4.2} = 7\% \text{ approximately}$$

As a result the numeric gain in wh. (watt hours) is equal to about 15.5%.

The invention is, of course, not limited to the examples or the embodiments described which are given by way of example only. Variations within the scope of the appended claims are possible and are contemplated. There is no intention, therefore, of limitation to the exact disclosure herein made.

What is claimed is:

1. An alkaline electric accumulator comprising positive and negative electrodes, a separator between adjacent electrodes of opposite polarity and alkaline electrolyte immobilized within the separator by retention due to capillarity, said separator consisting of a first layer of non-woven fibrous synthetic material unaffected by said electrolyte and having a high degree of capillarity being capable of quasi-instantaneous absorption of a drop of said electrolyte, and a second layer of felted fibrous material also unaffected by the said electrolyte in contact with said first layer and having a lower degree of capillarity than said first layer, said second layer requiring a period of approximately three minutes to absorb a drop of said electrolyte, said second layer being of substantially greater thickness than said first layer and being disposed to face and make surface contact with the said negative electrode.

2. The alkaline accumulator of claim 1 wherein the thickness of said second layer is at least triple that of said first layer.

3. The accumulator of claim 1 wherein all said fibers are of synthetic material selected from the group consisting of polyvinyl copolymer, polyamides and viscose.

4. The accumulator of claim 1 wherein all said fibers are of naturally occurring material selected from the group consisting of asbestos and mineral fibers.

References Cited by the Examiner

UNITED STATES PATENTS

| | | | |
|---|---|---|---|
| 2,810,775 | 10/57 | Raphael et al. | 136—146 |
| 2,930,829 | 3/60 | Jacquier | 136—143 |
| 2,994,728 | 8/61 | Herold | 136—145 |
| 3,014,085 | 12/61 | Bachman | 136—146 |

FOREIGN PATENTS 678,719  9/52  Great Britain.

WINSTON A. DOUGLAS, *Primary Examiner.*

JOHN H. MACK, *Examiner.*